(12) United States Patent
Larsen (10) Patent No.: US 9,599,237 B2
(45) Date of Patent: Mar. 21, 2017

(54) 3-WAY INLINE AIR OPERATED VALVE

(71) Applicant: TESCOM CORPORATION, Elk River, MN (US)

(72) Inventor: Todd William Larsen, Milaca, MN (US)

(73) Assignee: TESCOM CORPORATION, Elk River, MN (US)

( * ) Notice: Subject to any disclaimer, the term of this patent is extended or adjusted under 35 U.S.C. 154(b) by 148 days.

(21) Appl. No.: 14/508,045

(22) Filed: Oct. 7, 2014

(65) Prior Publication Data

US 2016/0097460 A1   Apr. 7, 2016

(51) Int. Cl.
| | |
|---|---|
| *F16K 11/065* | (2006.01) |
| *F16K 1/42* | (2006.01) |
| *F16K 11/044* | (2006.01) |
| *F16K 27/02* | (2006.01) |

(52) U.S. Cl.
CPC ............ *F16K 11/065* (2013.01); *F16K 1/427* (2013.01); *F16K 11/044* (2013.01); *F16K 27/0263* (2013.01); *Y10T 137/7834* (2015.04); *Y10T 137/86879* (2015.04); *Y10T 137/87877* (2015.04)

(58) Field of Classification Search
CPC ................. F16K 11/044; F16K 11/065; Y10T 137/7834; Y10T 137/86879; Y10T 137/87877
USPC ..................................... 137/508, 625.48, 883
See application file for complete search history.

(56) References Cited

U.S. PATENT DOCUMENTS

| | | | | |
|---|---|---|---|---|
| 2,729,226 A | | 1/1956 | Jones | |
| 3,446,233 A | * | 5/1969 | Herold | ................ F04D 15/0005 137/119.07 |
| 3,590,847 A | * | 7/1971 | Worden | ................... F16K 1/123 137/116.5 |
| 3,635,247 A | * | 1/1972 | Myers | .................... F16K 11/044 137/625.5 |
| 4,779,639 A | * | 10/1988 | Loos | ..................... G05D 16/106 137/115.05 |
| 5,236,002 A | * | 8/1993 | Martin | .................. F16K 11/048 137/119.06 |
| 5,261,454 A | * | 11/1993 | Pavlica | .................. B64D 25/10 137/625.48 |

(Continued)

FOREIGN PATENT DOCUMENTS

| | | |
|---|---|---|
| DE | 20014697 U1 | 12/2000 |
| FR | 1454090 A | 9/1966 |

OTHER PUBLICATIONS

International Search Report and Written Opinion for PCT/US2015/054374 dated Jan. 25, 2016.

*Primary Examiner* — Michael R Reid
*Assistant Examiner* — Christopher Ballman
(74) *Attorney, Agent, or Firm* — Marshall, Gerstein & Borun LLP (57) ABSTRACT

A control valve includes a body, a first end cap, a second end cap, an insert, and a piston. The first end cap, second end cap, and insert are removably secured to the body and define a first port, second port, and third port of the control valve, respectively. The piston is positioned within the bore of the body and is movable between a first position in which the first port is in fluid communication with the second port and not with the third port and a second position in which the first port is in fluid communication with the third port and not with the second port.

25 Claims, 4 Drawing Sheets

(56) References Cited

U.S. PATENT DOCUMENTS

| | | | |
|---|---|---|---|
| 5,549,131 A * | 8/1996 | Maxwell | F04D 15/0011 |
| | | | 137/115.03 |
| 6,209,582 B1 | 4/2001 | Ashley et al. | |
| 7,077,163 B2 * | 7/2006 | Schwarz | F16K 11/22 |
| | | | 137/883 |
| 7,159,611 B2 | 1/2007 | Larsen | |
| 7,681,596 B2 * | 3/2010 | Reck | F16K 5/0605 |
| | | | 137/625.47 |
| 7,766,309 B1 | 8/2010 | Smythe | |
| 2003/0098075 A1 | 5/2003 | Possanza et al. | |
| 2005/0155652 A1 * | 7/2005 | Morrow | F16K 15/025 |
| | | | 137/508 |

* cited by examiner

3-WAY INLINE AIR OPERATED VALVE

FIELD OF THE DISCLOSURE

This disclosure relates generally to inline air operated valves and, more specifically, to 3-way, 2 position, inline air operated valves.

BACKGROUND

Plants and factories utilize process control devices to control the flow of fluids in processes, wherein "fluids" may include liquids, gases, or any mixture that can flow through a pipe. Manufacturing processes that create consumer articles or goods such as fuel, food, and clothes require control valves to control and regulate fluid flow. Even a medium sized factory may utilize hundreds of control valves to control a process.

When designing a process, the designer is faced with many design requirements and design constraints. For example, some process control applications require a valve to enable flow in two directions, which are often called bi-directional flow valves. Another example of a design constraint includes the pressure at which the fluid will be operating within the process. For example, some processes operate at relatively low pressures, e.g., less than approximately 10,000 pounds per square inch gauge (psig), while other processes may operate at relatively high pressures, e.g., greater than 10,000 psig, and up to approximately 20,000 psig.

In certain circumstances, a 2-way or bi-directional valve may not be sufficient to achieve the desired functionality for a selected part of the system. Accordingly, designers wishing to equip a process system with a 3-way functionality may opt to use a tri-directional or 3-way valve. However, in comparison to 2-way valves, 3-ways valves can have various drawbacks. For example, due to the multiple flow paths, typical 3-way valves use tortured flow paths through the valve and have inefficient flow between the inlet and outlet ports of the valve. The current designs also require large forces to actuate the valve, many times to overcome the pressure of the operating fluid flowing through the valve, and to fully close the valve, which increases the actuation time, requires larger valves to accommodate the larger volume required for activation, and may require large actuators as part of the valve. Finally, current 3-way valves come in standard sizes with standard connectors at each port, which requires manufacturers and retailers to manufacture and stock a large number of different variations of 3-way valve.

BRIEF SUMMARY OF THE DISCLOSURE

In accordance with one exemplary aspect of the present invention, a control valve comprises a body, a first end cap, a second end cap, an insert, and a piston. The body has a longitudinal bore that defines a first aperture at a first end of the body and a second aperture at a second end of the body, opposite the first end of the body, and a radial third aperture in fluid communication with the bore of the body. The first end cap has a longitudinal bore defining a first port of the control valve, is positioned adjacent the first end of the body, extends into the bore of the body through the first aperture, and is removably secured to the body. The second end cap has a longitudinal bore defining a second port of the control valve, is positioned adjacent the second end of the body, extends into the bore of the body through the second aperture, and is removably secured to the body. The insert has a bore defining a third port of the control valve, is positioned adjacent the third aperture and is removably secured to the body. The piston is positioned within the bore of the body and is movable between a first position, in which the first port is in fluid communication with the second port and not with the third port, and a second position, in which the first port is in fluid communication with the third port and not with the second port.

In accordance with another exemplary aspect of the present invention, a control valve comprises a body, a first end cap, a second end cap, a piston, a first valve seat, and a second valve seat. The body has a longitudinal bore that defines a first aperture at a first end of the body and a second aperture at a second end of the body, opposite the first end of the body, and a radial third aperture in fluid communication with the bore of the body. The first end cap has a longitudinal bore defining a first port of the control valve, is positioned adjacent the first end of the body and extends into the bore of the body through the first aperture. The second end cap has a longitudinal bore defining a second port of the control valve, is positioned adjacent the second end of the body and extends into the bore of the body through the second aperture. The piston is positioned within the bore of the body and is movable between a first position, in which the first port is in fluid communication with the third aperture and not with the third port, and a second position, in which the first port is in fluid communication with the third port and not with the third aperture. The first valve seat is secured to the first end cap such that the first valve seat can move radially to allow the first valve seat to align and seal with a second sealing surface of the piston when the piston moves into the second position. The second valve seat is secured to the second end cap such that the second valve seat can move radially to allow the second valve seat to align and seal with a first sealing surface of the piston when the piston moves into the first position.

In further accordance with any one or more of the foregoing exemplary aspects of the present invention, a control valve may further include, in any combination, any one or more of the following preferred forms.

In one preferred form, the piston is balanced.

In another preferred form, the control valve further comprises a spring positioned within the bore of the body, the spring biasing the piston toward one of the first position and the second position.

In another preferred form, the spring is outside a flow of an operating fluid.

In another preferred form, the body, the piston, and one of the first end cap and the second end cap together define an actuation cavity and the body further comprises an actuation port formed radially through the body and in fluid communication with the actuation cavity.

In another preferred form, the control valve further comprises a spring positioned within the bore of the body and the spring biases the piston toward the activation cavity.

In another preferred form, the first end cap is removably secured to the body by at least one threaded member.

In another preferred form, the first end cap comprises a valve seat that engages a second sealing surface of the piston with the control valve in the second position.

In another preferred form, the valve seat is radially displaceable.

In another preferred form, the second end cap is removably secured to the body by at least one threaded member.

In another preferred form, wherein the second end cap comprises a valve seat that engages a first sealing surface of the piston with the control valve in the first position.

In another preferred form, the valve seat is radially displaceable.

In another preferred form, the second end cap comprises at least one transverse bore in fluid communication with the longitudinal bore of the body and the longitudinal bore of the second end cap.

In another preferred form, the first valve seat is removably secured to the first end cap.

In another preferred form, the first valve seat is secured to first end cap with at least one set screw that are threaded through threaded holes in the first valve seat and extend into a groove formed in the first end cap.

In another preferred form, the second valve seat is removably secured to the second end cap.

In another preferred form, the second valve seat is secured to the second end cap with a threaded member that extends through a hole in the second valve seat and engages a threaded hole in the second valve seat.

In another preferred form, the control valve comprises an insert having a bore defining a third port of the control valve, the insert positioned adjacent the third aperture and secured to the body.

In another preferred form, the insert is removably secured to the body.

In another preferred form, the first end cap and the second end cap are removably secured to the body.

DETAILED DESCRIPTION

The 3-way control valve described herein provides a customizable valve having an improved flow path through the valve and provides a design that requires a smaller force to actuate and close the valve, which reduces actuation time and eliminates the need for high volume, high pressure actuators and for large external actuators. The control valve can have a variety of uses, such as a typical 3-way diverter valve. For example, the control valve can be used as an oil/fuel diverter where a first port is an inlet port, a second port is an outlet port connected to an oil/fuel distribution line and a third port is an outlet port connected back to an oil/fuel storage tank. In a first position, the operating fluid is directed back to the storage tank through the first and third ports and in a second position the operating fluid is directed to the distribution line through the first and second ports to fill oil/fuel containers.

In addition, the inlet and outlet ports can be reversed and the control valve can be used as a multi-fluid selection valve. For example, the second and third ports can each be connected to different fluid storage tanks and the first port can be used as an outlet. In one position the fluid from the third port would flow to first port and in the second position the fluid from the second port would flow to the first port.

Figure 1:
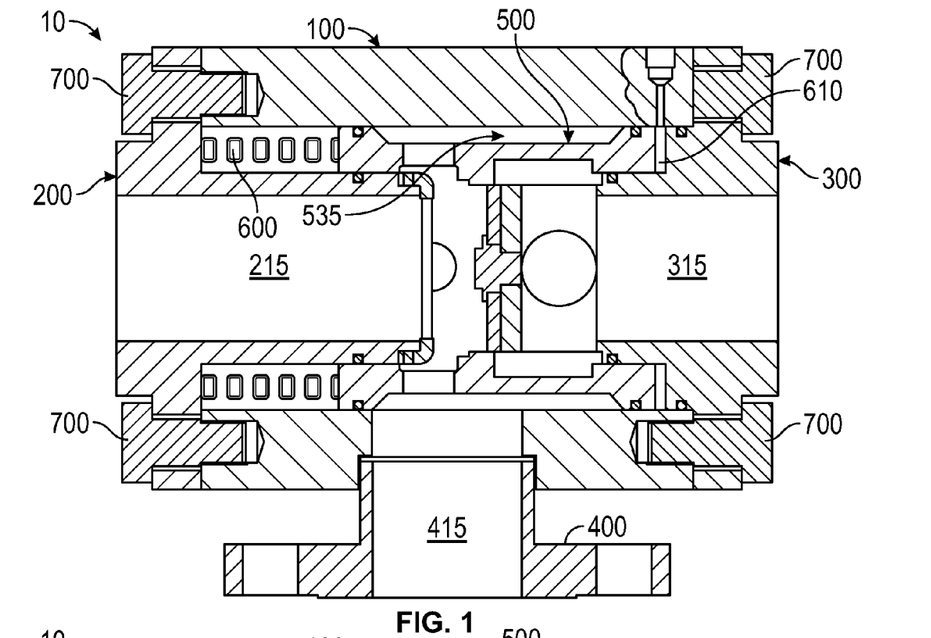
FIG. 1 is a side cross sectional view of an example normally closed control valve in an un-actuated position.
Figure 2:
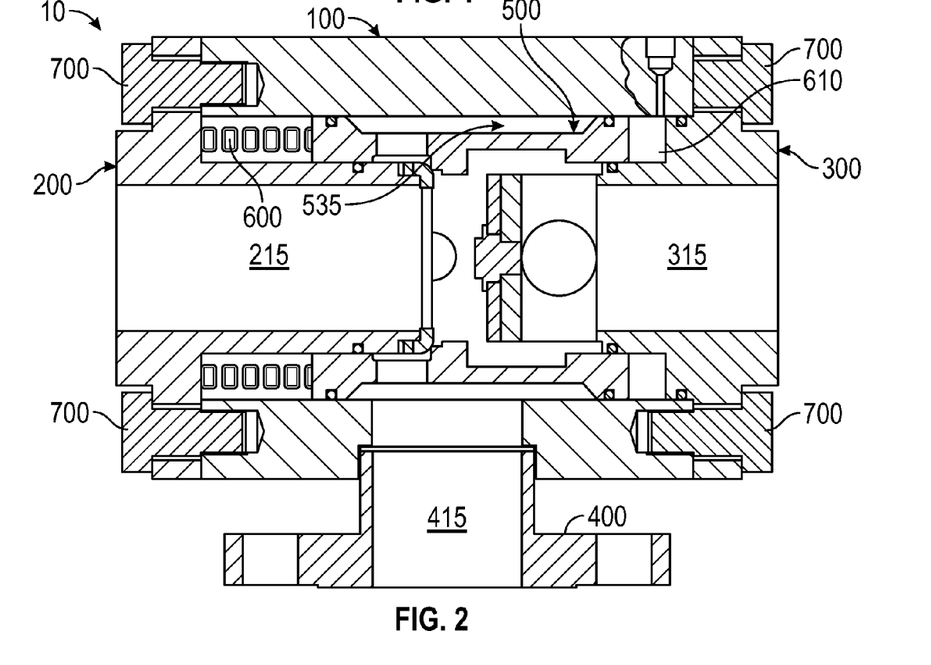
FIG. 2 is a side cross sectional view of the example control valve of FIG. 1 in an actuated position.
Figure 3:
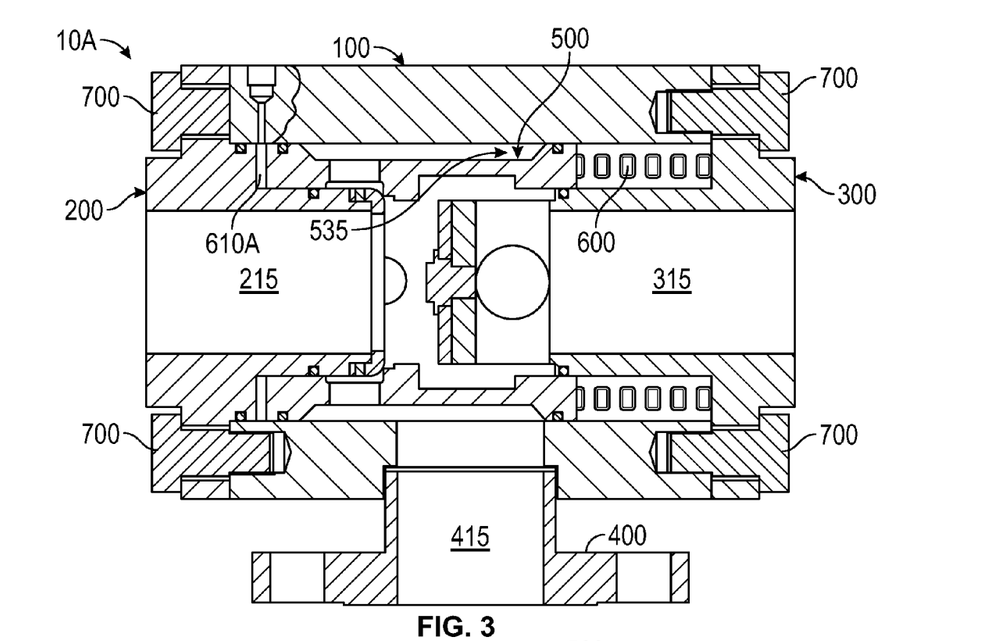
FIG. 3 is a side cross-sectional view of an example normally open control valve in an un-actuated position.
Figure 4:
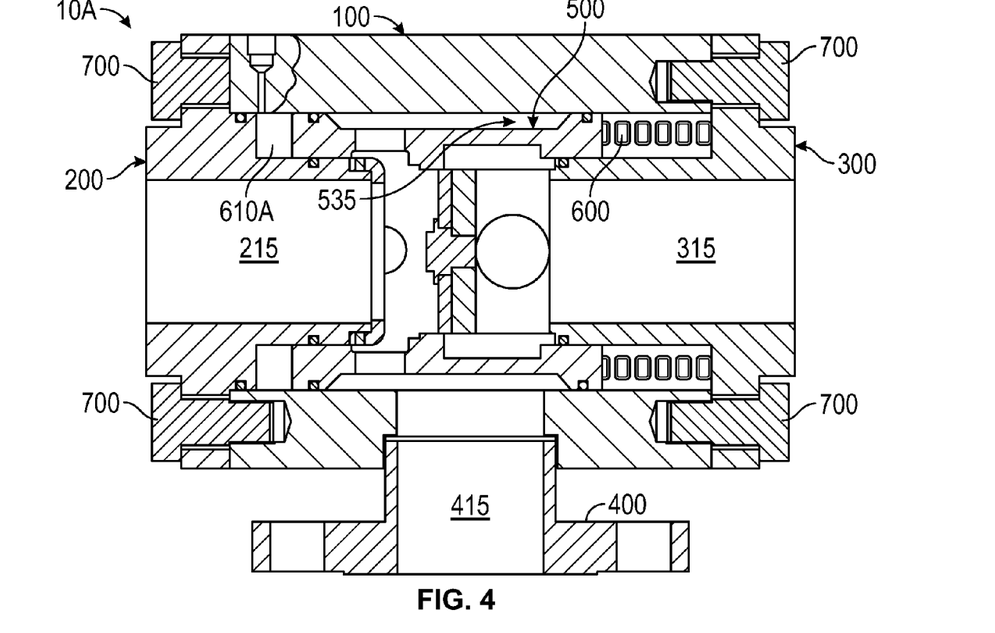
FIG. 4 is a side cross-sectional view of the example control valve of FIG. 3 in an actuated position.

Referring to FIGS. 1-4, an example control valve 10, 10A generally includes body 100, first end cap 200, second end cap 300, insert 400, piston 500, and spring 600. The example control valve 10 in FIGS. 1 and 2 is configured for fluid flow between first end cap 200 and insert 400 in the un-actuated state (FIG. 1) and for fluid flow between first end cap 200 and second end cap 300 in the actuated state (FIG. 2) (e.g., a normally closed control valve). The example control valve 10A in FIGS. 3 and 4 has the same basic structure as control valve 10 in FIGS. 1 and 2, except that control valve 10A is configured for fluid flow between first end cap 200 and second end cap 300 in the un-actuated state (FIG. 3) and for fluid flow between first end cap 200 and insert 400 in the actuated state (FIG. 4) (e.g., a normally open control valve). For simplicity, control valve 10 of FIGS. 1 and 2 will be described in detail herein with the understanding that the structure of control valve 10A of FIGS. 3 and 4 is the same with the position of the first end cap 200, second end cap 300, piston 500, and spring 600 reversed to create a control valve having fluid flow between the first end cap 200 and second end cap 300 when the control valve is un-actuated.

Figure 5:
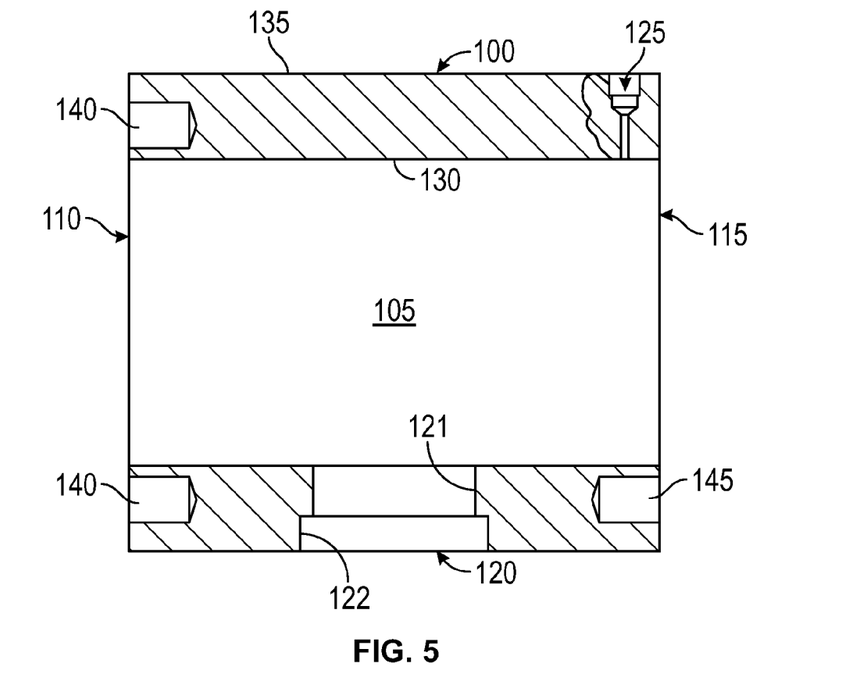
FIG. 5 is a side cross sectional view of the body of the example control valve of FIG. 1.

As shown in FIG. 5, body 100 is generally cylindrical and has a bore 105 formed longitudinally therethrough that extends from a first aperture 110 at a first end of body 100 to a second aperture 115 at a second end of body 100, opposite the first end. A third aperture 120 and an actuation port 125 are formed radially through body 100 between outer surface 135 and inner surface 130 of body 100 and are in fluid communication with bore 105. In the example shown, third aperture 120 has a first portion 121 having a first diameter and an second portion 122 having a second diameter, which is larger than the first diameter. The second portion 122 is configured to engage and secure insert 400, for example, through a threaded connection, welds, etc. Actuation port 125 is configured to connect to an external hose or pipe, for example through a threaded connection or quick connect connection, to provide a pressurized actuation fluid, such as air, into bore 105 to actuate and de-actuate control valve 10, as discussed below.

Figure 6:
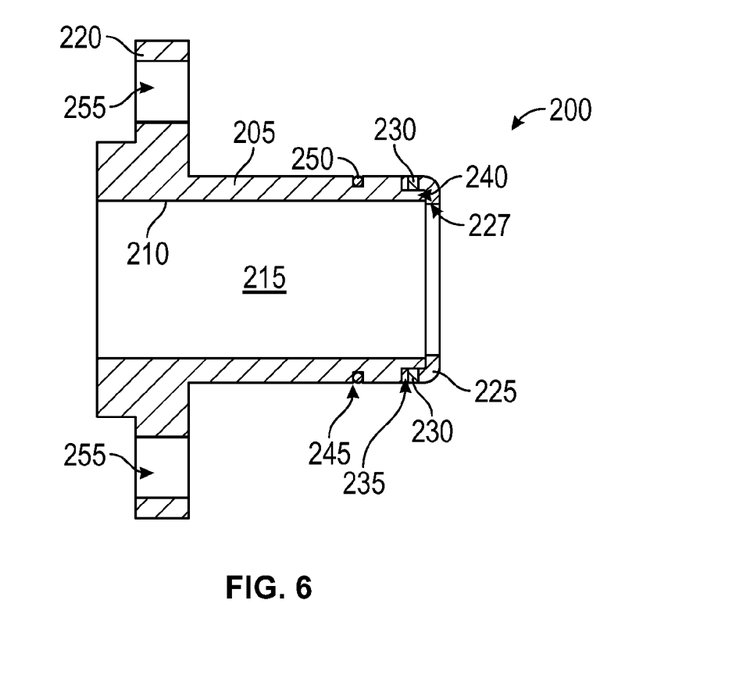
FIG. 6 is a side cross sectional view of the first end cap of the example control valve of FIG. 1.

As shown in FIG. 6, first end cap 200 has a generally cylindrical body 205 having an outer diameter that is smaller than the inner diameter of bore 105 in body 100, such that a portion of piston 500 and spring 600 can be positioned between body 100 and body 205 of first end cap 200. A bore 210 is formed longitudinally through body 205, which defines a first port 215 of control valve 10, and a flange 220 extends radially from body 205. Valve seat 225 is positioned at an end of body 205 and is secured to body 205 with one or more set screws 230, which are threaded through holes 235 in valve seat 225 and extend into a first groove 240 formed in the outer surface of body 205. Set screws 230 prevent or limit longitudinal movement of valve seat 225 along a longitudinal axis of first end cap 200, while allowing valve seat 225 to move radially to align and seal with a second sealing surface 585 of piston 500. Allowing valve seat 225 to move radially and align with second sealing surface 585 to provide a better seal assists in decreasing the actuation pressure required to actuate valve 10, as an increased actuation pressure is not required to assist in providing a reliable seal. In addition, securing valve seat 225 to body 205 with set screws 230 allows for easy replacement of valve seat 225. Valve seat 225 also has an opening 227 that is generally aligned with bore 210 in body 200 and has a diameter that is substantially the same as the diameter of bore 210. A second groove 245 is also formed in the outer surface of body 205 and receives an O-ring 250, or other type of sealing member, to provide a seal and prevent the flow of fluid between first end cap 200 and piston 500. Body 205 of first end cap 200 is positioned in bore 105 of body 100 and, in the example shown, is removably secured to body 100 with threaded members 700 (FIGS. 1-4), which extend through holes 255 in flange 220 and are threaded into threaded holes 140 formed in the first end of body 100 (FIG. 5).

Figure 7:
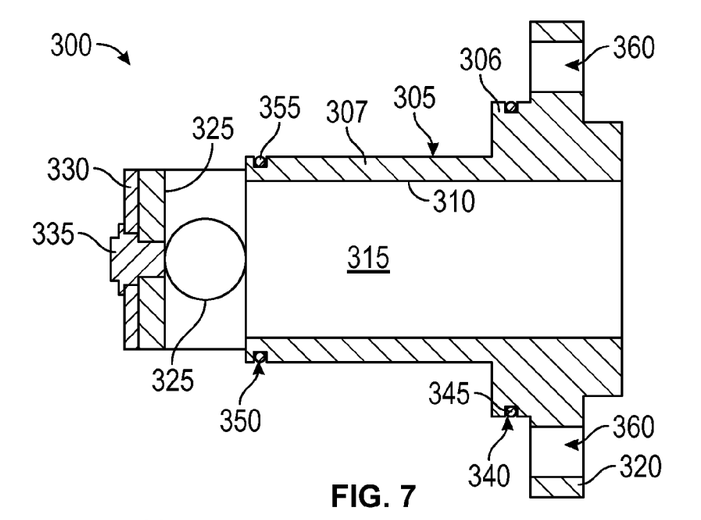
FIG. 7 is a side cross sectional view of the second end cap of the example control valve of FIG. 1.

As shown in FIG. 7, second end cap 300 has a generally cylindrical body 305 with a first portion 306 having an outer diameter that is slightly smaller than the inner diameter of bore 105 in body 100 and a second portion 307 having an outer diameter that is smaller than the inner diameter of bore 105, such that a portion of piston 500 can be positioned between body 100 and second portion 307 of second end cap 300. A first groove 340 is formed in an outer surface of the first portion 306 of body 305 and receives an O-ring 345, or other type of sealing member, to provide a seal and prevent the flow of fluid between body 100 and second end cap 300. In addition, a second groove 350 is formed in an outer surface of the second portion of body 305 and receives an O-ring 355, or other type of sealing member, to provide a seal and prevent the flow of fluid between second end cap 300 and piston 500. A bore 310 is formed longitudinally part way through body 305, which defines a second port 315 of control valve 10, and a flange 320 extends radially from body 305. One or more transverse bores 325 are formed radially through body 305 to provide fluid communication between bore 310 of second end cap 300 and bore 105 of body 100. A valve seat 330 is positioned at an end of body 305 and is secured to body 305 with a threaded member 335, which extends through a hole in valve seat 330 and is threaded into a threaded aperture in the end of second end cap 300. The hole in valve seat 330 has a diameter that is slightly larger than the outer diameter of threaded member 335 so that threaded member 335 prevents or limits longitudinal movement of valve seat 330 along a longitudinal axis of second end cap 300 while allowing valve seat 330 to move radially to align and seal with a first sealing surface 575 of piston 500. Allowing valve seat 330 to move radially and align with first sealing surface 575 to provide a better seal assists in decreasing the actuation pressure required to actuate valve 10, as an increased actuation pressure is not required to assist in providing a reliable seal. In addition, securing valve seat 330 to body 305 with threaded member 335 allows for easy replacement of valve seat 330. Body 305 of second end cap 300 is positioned in bore 105 of body 100 and, in the example shown, second end cap 300 is removably secured to body 100 with threaded members 700 (FIGS. 1-4), which extend through holes 360 in flange 320 and are threaded into threaded holes 145 formed in the second end of body 100 (FIG. 5).

Figure 8:
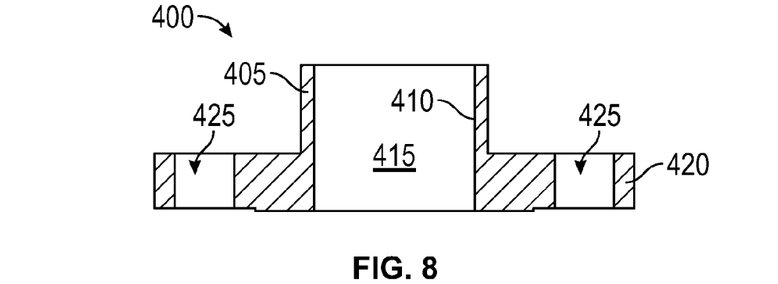
FIG. 8 is a side cross sectional view of the insert of the example control valve of FIG. 1.

As shown in FIG. 8, insert 400 has a generally cylindrical body 405 that is received in second portion 122 of third aperture 120 of body 100 and can be removably secured to body 100 via threads or other means. A bore 410 is formed through body 405, which defines a third port 415 of control valve 10, and has a diameter that is generally the same as the diameter of first portion 121 of third aperture 120 of body 100. A flange 420 extends radially from body 405 and can be used to connect a hose, pipe, or other fluid conduit to insert 400 through holes 425. Although insert 400 is shown herein as a flanged insert, insert 400 could be any type of insert that is adapted to make any type of required connection. In addition, insert 400 may not be required and third aperture 120 could be threaded or have a quick connect system that allows connection directly to body 100 without the use of an insert, in which case third aperture 120 would define the third port of the control valve 10.

First end cap 200, second end cap 300, and insert 400 can have a variety of connectors (now shown), such as flanges, internal threads, external threads, quick-connect connecters, pipe stubs for welding, etc., depending on the system control valve 10 will be installed in. Since first end cap 200, second end cap 300, and insert 400 are removably secured to body 100, a large number of valves having different sizes and connectors can easily be assembled, modified, and customized while only stocking a limited number of parts.

Figure 9:
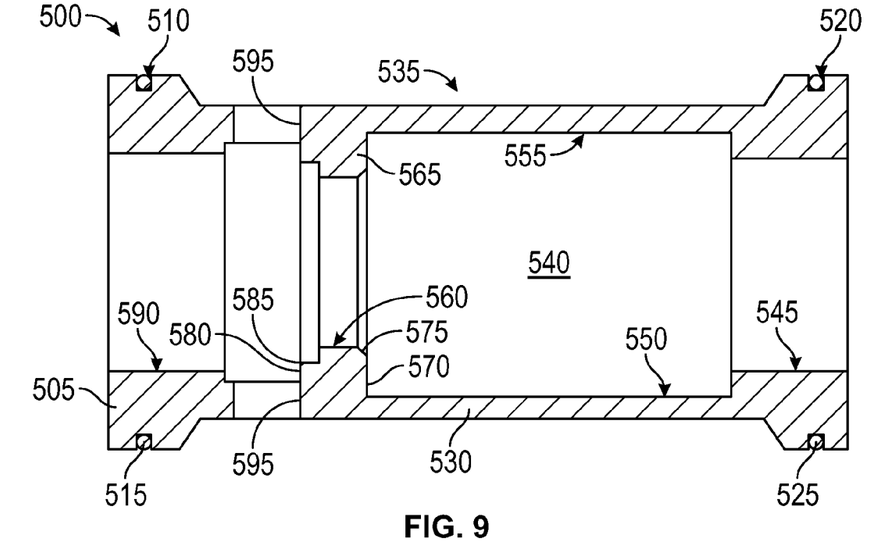
FIG. 9 is a side cross sectional view of the piston of the example control valve of FIG. 1.

As shown in FIG. 9, piston 500 has a generally cylindrical body 505, which has an outer dimension that allows body 505 to be received in bore 105 of body 100. First and second grooves 510, 520 are formed in an outer surface of body 505 and receive first and second O-rings 515, 525, respectively, to provide a seal and prevent the flow of fluid between body 100 and piston 500. Body 505 also has a recessed portion 530 that defines an outer channel 535, which allows the flow of fluid around piston 500 and fluid communication between first end cap 200 and insert 400 with control valve 10 in an un-actuated position (FIG. 1) or control valve 10A in an actuated position (FIG. 4).

A bore 540 is formed longitudinally through body 505 and has a first portion 545 that is dimensioned to receive first portion 306 of second end cap 300 and engage second O-ring of second end cap 300. A second portion 550 of bore 540 has a radial dimension that is larger than that of first portion 545 and defines in inner channel 555, which allows the flow of fluid around second end cap 300 and fluid communication between first end cap 200 and second end cap 300 with control valve 10 in an actuated position (FIG. 2) or control valve 10A in an un-actuated position (FIG. 3). A protrusion 565 extends into bore 540 and defines a third portion 560 of bore 540, which has a radial dimension that is smaller than that of second portion 550. A first side 570 of protrusion 565 defines a first sealing surface 575, which engages second valve seat 330 of second end cap 300 to prevent the flow of fluid between first end cap 200 and second end cap 300 with control valve 10 in an un-actuated position (FIG. 1) or control valve 10A in an actuated position (FIG. 4). A second side 580 of protrusion 565 defines a second sealing surface 585, which engages first valve seat 225 of first end cap 200 to prevent the flow of fluid between first end cap 200 and insert 400 with control valve 10 in an actuated position (FIG. 2) or control valve 10A in an un-actuated position (FIG. 3). A fourth portion 590 of bore 540 is dimensioned to receive body 205 of first end cap 200 and engage O-ring 250 of first end cap 200.

One or more axial holes 595 are formed radially through body 505 to provide fluid communication between first end cap 200 and insert 400 through bore 540, outer channel 535, and first portion 121 of third aperture 120 in body 100 with control valve 10 in an un-actuated position (FIG. 1) or control valve 10A in an actuated position (FIG. 4).

Referring to FIGS. 1 and 2, piston 500 is positioned within bore 105 of body 100 and O-rings 515, 525 engage inner surface 130 of body 100 to provide a seal and prevent the flow of fluid between piston 500 and body 100 past O-rings 515, 525.

Body 205 of first end cap 200 is positioned within bore 105 of body 100 through first aperture 110 and within fourth portion 590 of bore 540 of piston 500 and O-ring 250 engages fourth portion 590 to provide a seal and prevent the flow of fluid between piston 500 and first end cap 200 past O-ring 250. First end cap 200 is removably secured to body 100 with threaded members 700, which extend through holes 255 in flange 220 and engage threaded holes 140 in body 100. Spring 600 is positioned within bore 105 of body 100 and around body 205 of first end cap 200. Spring 600 engages flange 220 of first end cap 200 at one end and an end of piston 500 at the opposite end to bias piston 500 toward second end cap 300. Having spring 600 outside of the flow of the operating fluid protects spring 600 from possible wear and damage that can occur to spring 600 from contact with the operating fluid, such as corrosion. Therefore, a larger variety of springs can be used and maintenance of control valve 10 due to worn out and damaged springs is reduced.

First and second portions 306, 307 of second end cap 300 are positioned within bore 105 of body 100 through second aperture 115 and second portion 307 is positioned within first portion 545 of bore 540 of piston 500. O-ring 345 engages inner surface 130 of body 100 to provide a seal and prevent the flow of fluid between second end cap 300 and body 100 past O-ring 345 and O-ring 355 engages first portion 545 of bore 540 to provide a seal and prevent the flow of fluid between piston 500 and second end cap 300 past O-ring 355. Second end cap 300 is removably secured to body 100 with threaded members 700, which extend through holes 360 in flange 320 and engage threaded holes 145 in body 100. When assembled, body 100, second end cap 300, and piston 500 define actuation cavity 610, which is in fluid communication with actuation port 125 in body 100.

The position of piston 500 relative to body 100, first end cap 200, and second end cap 300, provides balanced valve design so that pressure from the operating fluid acts minimally on piston 500 and spring and actuation pressure do not need to be increased to overcome force of fluid flow. This allows actuation cavity 610 to have a smaller volume and requires less actuation pressure, which decreases the actuation time, allows the control valve 10 to be smaller, and eliminates the need for a large external actuator.

Body 405 of insert 400 is positioned within second portion 122 of third aperture 120 of body 100 and insert 400 is secured to body 100 through some type of connection means, such as threads, welds, etc.

When an actuation fluid, such as compressed air, is not being supplied to actuation cavity 610 of control valve 10 or is being supplied at a pressure less than the force applied by spring 600, spring 600 biases piston 500 toward second end cap 300 until first sealing surface 575 of piston 500 engages second valve seat 330 of second end cap 300. In this un-actuated position (FIG. 1), fluid is allowed to flow between first port 215 defined by first end cap 200 and third port 415 defined by insert 400 through bore 210, bore 540, axial holes 595, outer channel 535, and first portion 121 of third aperture 120. Fluid flow to or from second end cap 300 is prevented by the seal formed between first sealing surface 575 of piston 500 and second valve seat 330 of second end cap 300.

When the actuation fluid is supplied to actuation cavity 610 of control valve 10 at a pressure greater than the force applied by spring 600, the pressure of the actuation fluid in actuation cavity 610 moves piston 500 toward first end cap 200 until second sealing surface 585 of piston 500 engages first valve seat 225 of first end cap 200. In this actuated position (FIG. 2), fluid is allowed to flow between first port 215 defined by first end cap 200 and second port 315 defined by second end cap 300 through bore 210, bore 540, inner channel 555, transverse bores 325, and longitudinal bore 310. The generally linear flow path from first port 215 to second port 315 improves the inline flow of control valve 10. Fluid flow to or from insert 400 is prevented by the seal formed between second sealing surface 585 of piston 500 and first valve seat 225 of first end cap 200.

Referring to FIGS. 3 and 4, control valve 10A is similar to control valve 10 of FIGS. 1 and 2, except that first and second end caps 200, 300 are positioned in opposite apertures 110, 115 from that of control valve 10. This configuration provides a control valve 10A that allows fluid communication between first port 215 and second port 315 in the un-actuated position (FIG. 3) and fluid communication between first port 215 and third port 415 in the actuated position (FIG. 4). In control valve 10A, piston 500 is position within bore 105 of body 100 and O-rings 515, 525 engage inner surface 130 of body 100 to provide a seal and prevent the flow of fluid between piston 500 and body 100 past O-rings 515, 525.

Body 205 of first end cap 200 is positioned within bore 105 of body 100 through second aperture 115 and within fourth portion 590 of bore 540 of piston 500 and O-ring 250 engages fourth portion 590 to provide a seal and prevent the flow of fluid between piston 500 and first end cap 200 past O-ring 250. First end cap 200 is secured to body 100 with threaded members 700, which extend through holes 255 in flange 220 and engage threaded holes 145 in body 100.

First and second portions 306, 307 of second end cap 300 are positioned within bore 105 of body 100 through first aperture 110 and first portion 545 of bore 540 of piston 500. O-ring 345 engages inner surface 130 of body 100 to provide a seal and prevent the flow of fluid between second end cap 300 and body 100 past O-ring 345 and O-ring 355 engages first portion 545 of bore 540 to provide a seal and prevent the flow of fluid between piston 500 and second end cap 300 past O-ring 355. Second end cap 300 is secured to body 100 with threaded members 700, which extend through holes 360 in flange 320 and engage threaded holes 140 in body 100. Spring 600 is positioned within bore 105 of body 100 and around second portion 307 of body 305 of second end cap 300. Spring 600 engages flange 320 of second end cap 300 at one end and an end of piston 500 at the opposite end to bias piston 500 toward first end cap 300. Having spring 600 outside of the flow of the operating fluid protects spring 600 from possible wear and damage that can occur to spring 600 from contact with the operating fluid, such as corrosion. Therefore, a larger variety of springs can be used and maintenance of control valve 10A due to worn out and damaged springs is reduced. When assembled, body 100, first end cap 200, and piston 500 define actuation cavity 610A, which is in fluid communication with actuation port 125 in body 100.

The position of piston 500 relative to body 100, first end cap 200, and second end cap 300, provides balanced valve design so that pressure from the operating fluid acts minimally on piston 500 and spring and actuation pressure do not need to be increased to overcome force of fluid flow. This allows actuation cavity 610A to have a smaller volume and requires less actuation pressure, which decreases the actuation time, allows the control valve 10 to be smaller, and eliminates the need for a large external actuator.

Body 405 of insert 400 is positioned within second portion 122 of third aperture 120 of body 100 and insert 400 is secured to body 100 through some type of connection means, such as threads, welds, etc.

When an actuation fluid, such as compressed air, is not being supplied to actuation cavity 610A of control valve 10A or is being supplied at a pressure less than the force applied by spring 600, spring 600 biases piston 500 toward first end cap 200 until second sealing surface 585 of piston 500 engages first valve seat 225 of first end cap 200. In this un-actuated position (FIG. 3), fluid is allowed to flow between first port 215 defined by first end cap 200 and second port 315 defined by second end cap 300 through bore 210, bore 540, inner channel 555, transverse bores 325, and longitudinal bore 310. The generally linear flow path from first port 215 to second port 315 improves the inline flow of control valve 10A. Fluid flow to or from insert 400 is prevented by the seal formed between second sealing surface 585 of piston 500 and first valve seat 225 of first end cap 200.

When the actuation fluid is supplied to actuation cavity 610A of control valve 10A at a pressure greater than the force applied by spring 600, the pressure of the actuation fluid in actuation cavity 610A moves piston 500 toward second end cap 300 until first sealing surface 575 of piston 500 engages second valve seat 330 of second end cap 300. In this actuated position (FIG. 4), fluid is allowed to flow between first end cap 200 and insert 400 through bore 210, bore 540, axial holes 595, outer channel 535, and first portion 121 of third aperture 120. Fluid flow to or from second end cap 300 is prevented by the seal formed between first sealing surface 575 of piston 500 and second valve seat 330 of second end cap 300.

While various embodiments have been described above, this disclosure is not intended to be limited thereto. Variations can be made to the disclosed embodiments that are still within the scope of the appended claims.

What is claimed is:

1. A control valve, comprising:
   a body having a longitudinal bore that defines a first aperture at a first end of the body and a second aperture at a second end of the body, opposite the first end of the body, and a radial third aperture in fluid communication with the bore of the body;
   a first end cap having a longitudinal bore defining a first port of the control valve, the first end cap positioned adjacent the first end of the body, extending into the bore of the body through the first aperture, and removably secured to the body;
   a second end cap having a longitudinal bore defining a second port of the control valve, the second end cap positioned adjacent the second end of the body, extending into the bore of the body through the second aperture, and removably secured to the body;
   an insert having a bore defining a third port of the control valve, the insert positioned adjacent the third aperture and removably secured to the body; and
   a piston positioned within the bore of the body and movable between a first position in which the first port is in fluid communication with the second port and not with the third port and a second position in which the first port is in fluid communication with the third port and not with the second port; wherein
   the body, the piston, and one of the first end cap and the second end cap together define an actuation cavity; and
   the body further comprises an actuation port formed radially through the body and in fluid communication with the actuation cavity.

2. The control valve of claim 1, wherein the piston is balanced.

3. The control valve of claim 1, further comprising a spring positioned within the bore of the body, the spring biasing the piston toward one of the first position and the second position.

4. The control valve of claim 3, wherein the spring is outside a flow of an operating fluid.

5. The control valve of claim 1, further comprising a spring positioned within the bore of the body, the spring biasing the piston toward the activation cavity.

6. The control valve of claim 1, wherein the first end cap is removably secured to the body by at least one threaded member.

7. The control valve of claim 1, wherein the first end cap comprises a valve seat that engages a second sealing surface of the piston with the control valve in the second position.

8. The control valve of claim 7, wherein the valve seat is radially displaceable.

9. The control valve of claim 1, wherein the second end cap is removably secured to the body by at least one threaded member.

10. The control valve of claim 1, wherein the second end cap comprises a valve seat that engages a first sealing surface of the piston with the control valve in the first position.

11. The control valve of claim 10, wherein the valve seat is radially displaceable.

12. The control valve of claim 1, wherein the second end cap comprises at least one transverse bore in fluid communication with the longitudinal bore of the body and the longitudinal bore of the second end cap.

13. A control valve, comprising:
   a body having a longitudinal bore that defines a first aperture at a first end of the body and a second aperture at a second end of the body, opposite the first end of the body, and a radial third aperture in fluid communication with the bore of the body;
   a first end cap having a longitudinal bore defining a first port of the control valve, the first end cap positioned adjacent the first end of the body and extending into the bore of the body through the first aperture;
   a second end cap having a longitudinal bore defining a second port of the control valve, the second end cap positioned adjacent the second end of the body and extending into the bore of the body through the second aperture;
   a piston positioned within the bore of the body and movable between a first position in which the first port is in fluid communication with the third aperture and not with the second port and a second position in which the first port is in fluid communication with the second port and not with the third aperture;
   a first valve seat secured to the first end cap such that the first valve seat can move radially to allow the first valve seat to align and seal with a second sealing surface of the piston when the piston moves into the second position; and
   a second valve seat secured to the second end cap such that the second valve seat can move radially to allow the second valve seat to align and seal with a first sealing surface of the piston when the piston moves into the first position.

14. The control valve of claim 13, wherein the first valve seat is removably secured to the first end cap.

15. The control valve of claim 14, wherein the first valve seat is secured to first end cap with at least one set screw that are threaded through threaded holes in the first valve seat and extend into a groove formed in the first end cap.

16. The control valve of claim 13, wherein the second valve seat is removably secured to the second end cap.

17. The control valve of claim 16, wherein the second valve seat is secured to the second end cap with a threaded member that extends through a hole in the second valve seat and engages a threaded hole in the second valve seat.

18. The control valve of claim 13, wherein the piston is balanced.

19. The control valve of claim 13, further comprising a spring positioned within the bore of the body, the spring biasing the piston toward one of the first position and the second position.

20. The control valve of claim 19, wherein the spring is outside a flow of an operating fluid.

21. The control valve of claim 13, wherein:
the body, the piston, and one of the first end cap and the second end cap together define an actuation cavity; and
the body further comprises an actuation port formed radially through the body and in fluid communication with the actuation cavity.

22. The control valve of claim 21, further comprising a spring positioned within the bore of the body, the spring biasing the piston toward the activation cavity.

23. The control valve of claim 22, further comprising an insert having a bore defining a third port of the control valve, the insert positioned adjacent the third aperture and secured to the body.

24. The control valve of claim 23, wherein the insert is removably secured to the body.

25. The control valve of claim 13, wherein the first end cap and the second end cap are removably secured to the body.

* * * * *

UNITED STATES PATENT AND TRADEMARK OFFICE
CERTIFICATE OF CORRECTION

PATENT NO.       : 9,599,237 B2
APPLICATION NO.  : 14/508045
DATED            : March 21, 2017
INVENTOR(S)      : Todd William Larsen Page 1 of 1

It is certified that error appears in the above-identified patent and that said Letters Patent is hereby corrected as shown below:

In the Specification

At Column 4, Line 41, "an" should be -- a --.

At Column 5, Line 6, "body 200" should be -- body 205 --.

At Column 8, Line 49, "first end cap 300." should be -- first end cap 200. --.

Signed and Sealed this
Tenth Day of October, 2017

Joseph Matal
*Performing the Functions and Duties of the
Under Secretary of Commerce for Intellectual Property and
Director of the United States Patent and Trademark Office*